US007596210B2

(12) United States Patent
Blohm (10) Patent No.: US 7,596,210 B2
(45) Date of Patent: Sep. 29, 2009

(54) PRESENCE ENHANCED OUTCALLING (75) Inventor: Jeffrey M. Blohm, Menlo Park, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 137 days.

(21) Appl. No.: 10/957,173

(22) Filed: Sep. 30, 2004

(65) Prior Publication Data
US 2006/0072720 A1    Apr. 6, 2006

(51) Int. Cl.
*H04M 1/64*    (2006.01)
(52) U.S. Cl. .............. 379/88.22; 379/88.23; 379/201.1; 379/209.01; 370/522
(58) Field of Classification Search .............. 379/88.17, 379/100.16, 211.01, 201.1, 207.12, 88.01, 379/88.13, 90.01, 211.02, 41, 51, 69, 88.03, 379/88.22, 88.23, 93.01, 209.01, 906; 455/412.2, 455/466, 413; 709/206, 202; 370/522
See application file for complete search history.

(56) References Cited

U.S. PATENT DOCUMENTS

| 5,487,105 | A | * | 1/1996 | Sakai .................... 379/100.16 |
| 6,091,947 | A | * | 7/2000 | Sumner ...................... 455/413 |
| 6,125,176 | A | * | 9/2000 | Foladare et al. ......... 379/211.02 |
| 6,493,558 | B1 | * | 12/2002 | Bernhart et al. ............. 455/466 |
| 6,658,095 | B1 | | 12/2003 | Yoakum et al. |
| 6,757,722 | B2 | | 6/2004 | Loonfors et al. |
| 6,965,666 | B1 | * | 11/2005 | Zhang ..................... 379/88.17 |
| 6,970,547 | B2 | | 11/2005 | Andrews et al. |
| 6,985,748 | B2 | * | 1/2006 | Knotts ........................ 455/466 |
| 6,987,847 | B1 | * | 1/2006 | Murphy et al. ........... 379/201.1 |
| 7,065,186 | B1 | * | 6/2006 | Myers et al. ............. 379/88.17 |
| 7,123,695 | B2 | * | 10/2006 | Malik ....................... 379/88.13 |
| 2002/0007397 | A1 | * | 1/2002 | Ouzounidis et al. .......... 709/206 |
| 2002/0085701 | A1 | * | 7/2002 | Parsons et al. ......... 379/211.01 |
| 2003/0135569 | A1 | * | 7/2003 | Khakoo et al. .............. 709/206 |
| 2003/0174814 | A1 | | 9/2003 | Diacakis |
| 2003/0194990 | A1 | * | 10/2003 | Helferich .................. 455/412.2 |
| 2004/0059781 | A1 | | 3/2004 | Yoakum et al. |
| 2004/0062383 | A1 | | 4/2004 | Sylvain |
| 2004/0122901 | A1 | | 6/2004 | Sylvain |
| 2004/0125941 | A1 | | 7/2004 | Yoakum |
| 2004/0161080 | A1 | * | 8/2004 | Digate et al. ............. 379/88.17 |

(Continued)

FOREIGN PATENT DOCUMENTS

WO    WO 01/45343 A2    6/2001

(Continued)

OTHER PUBLICATIONS

H. Sugano et al., Presence Information Data Format (PDIF), IETF Instant Messaging and Presence Protocol (IMPP) Working Group, May 2003.

J. Peterson, Common Profile for Presence (CPP), IETF Instant Messaging and Presence Protocol (IMPP) Working Group, Aug. 14, 2003.

(Continued)

*Primary Examiner*—Md S Elahee
(74) *Attorney, Agent, or Firm*—Brinks Hofer Gilson & Lione (57)    ABSTRACT

An outcalling system considers subscriber presence information in determining when to initiate attempts to deliver messages to the subscriber. The subscriber presence state may provide insight into the likelihood of successful message delivery. The outcalling system may decide to initiate or may forgo initiation of a delivery attempt based in part on the subscriber presence state.

24 Claims, 6 Drawing Sheets

U.S. PATENT DOCUMENTS

| | | | |
|---|---|---|---|
| 2004/0172454 A1* | 9/2004 | Appelman et al. | 709/206 |
| 2004/0177118 A1* | 9/2004 | Mason et al. | 709/206 |
| 2004/0247089 A1* | 12/2004 | Vishik et al. | 379/88.01 |
| 2005/0276397 A1* | 12/2005 | Hiatt et al. | 379/90.01 |
| 2006/0003745 A1* | 1/2006 | Gogic | 455/413 |
| 2006/0190525 A1* | 8/2006 | Bobde et al. | 709/202 |
| 2007/0192410 A1 | 8/2007 | Liversidge et al. | |

FOREIGN PATENT DOCUMENTS

| | | |
|---|---|---|
| WO | WO 01/45343 A3 | 6/2001 |
| WO | WO 03/049459 | 6/2003 |
| WO | WO 2004/114662 | 12/2004 |
| WO | WO 2005/083998 | 9/2005 |

OTHER PUBLICATIONS

P. Saint-Andre, Ed., Extensible Messaging and Presence Protocol (XMPP): Core, Jabber Software Foundation, May 6, 2004.

P. Saint-Andre, Mapping the Extensible Messaging and Presence Protocol (XMPP) to Common Presence and Instant Messaging (CPIM), Jabber Software Foundation, May 3, 2004.

P. Saint-Andre, Ed., Extensible Messaging and Presence Protocol (XMPP): Instant Messaging and Presence, Jabber Software Foundatin, Apr. 12, 2004.

M. Day et al., Instant Messaging / Presence Protocol Requirements (Request for Comments: 2779), IETF Instant Messaging and Presence Protocol (IMPP) Working Group, Feb. 2000.

M. Day et al., A model for Presence and Instant Messaging (Request for Comments: 2778), The Internet Society, Feb. 2000.

* cited by examiner

PRESENCE ENHANCED OUTCALLING

FIELD OF THE INVENTION

The present invention relates to messaging systems. In particular, the present invention relates to enhancing outcalling services provided by messaging systems through consideration of subscriber presence information.

BACKGROUND OF THE INVENTION

Effective communication is critical for successful business and personal life. The desire to enhance communication, in conjunction with rapid advances in processing technology, have lead to new and effective communication systems. For example, voice messaging services no longer simply accept messages for later retrieval. Instead, voice messaging services pro-actively place calls to subscribers in order to inform the subscriber that a message awaits retrieval. This messaging service feature is often referred to as "outcalling."

Outcalling configuration options in voice messaging systems provide the subscriber with a certain degree of control over the outcalling service. In some cases, the configuration options required the subscriber to explicitly specify a message delivery schedule, an outcalling contact number (e.g., a cell phone number or other voice capable device address), and a message preference (e.g., perform outcalling only for 'Urgent' messages). Once activated, the outcalling process repeatedly called the subscriber (e.g., every hour) until the subscriber explicitly acknowledged message receipt or retrieved the message.

Outcalling consumes valuable, limited, resources. Each time the messaging system places a call to the subscriber, the messaging system consumes a portion of those limited resources. As examples, each outcall may consume processor time, network bandwidth, physical channel (e.g., TDMA time slot) capacity, and other resources. Nevertheless, as noted above, prior voice messaging systems often blindly repeated outcalling attempts to a subscriber, with each attempt often wasting valuable channel resources.

A need has long existed for improved outcalling for voice messaging services.

SUMMARY

An outcalling system provides outcalling services for subscribers. The outcalling system considers subscriber presence states in determining when to initiate attempts to deliver voice messages to the subscriber. The outcalling system may decide to initiate a delivery attempt when the subscriber presence state indicates an increased likelihood of success in delivering the message. By considering subscriber presence state, the outcalling system may more effectively use the channel capacity available to the outcalling system. In addition, rather than adhering to a rigid retry schedule (e.g., once each hour), the outcalling system may decide to initiate a delivery attempt based on the presence state prior to expiration of the default retry period. Thus, the outcalling system may deliver messages sooner to the subscriber.

The outcalling system may maintain a presence state for a subscriber to a voice messaging system. For example, the outcalling system may subscribe to a presence information system for presence updates over time. When the outcalling system determines that a message is available for the subscriber, the outcalling system may consider the presence state in determining when to initiate the delivery attempt. The outcalling system may subscribe to the presence information system before or after the outcalling system has received a message to deliver.

The outcalling system may include a processor and a memory. The memory may store a presence state for a subscriber to the voice messaging system and an outcalling program. The outcalling program may include presence state evaluation instructions, and may determine or recommend whether to initiate the delivery attempt, giving consideration to the presence state. The processor executes the outcalling program.

The present invention is defined by the following claims, and nothing in this section should be taken as a limitation on those claims. Further aspects and advantages of the invention are discussed below in conjunction with the preferred embodiments. Any one or more of the above described aspects or aspects described below may be used independently or in combination with other aspects herein.

DETAILED DESCRIPTION

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the outcalling system may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the outcalling systems will be described, methods, systems, and articles of manufacture consistent with the outcalling systems may include additional or different components. For example, a processor may be implemented as a microprocessor, microcontroller, application specific integrated circuit (ASIC), discrete logic, or a combination of other types of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. The programs discussed below may be parts of a single program, separate programs, or distributed across several memories and processors.

Figure 1:
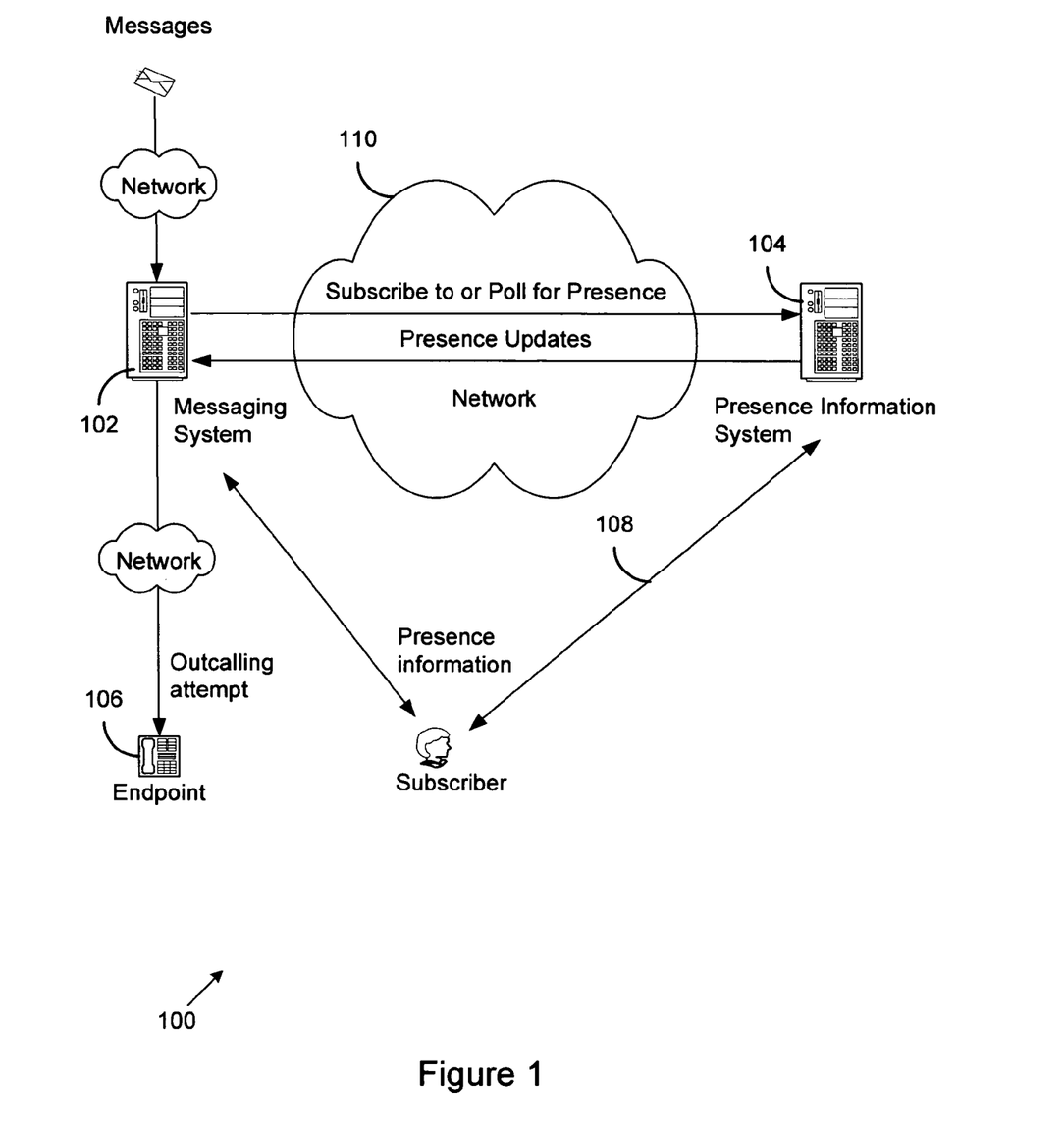
FIG. 1 illustrates one implementation of a network that includes voice messaging.

FIG. 1 shows a voice messaging network 100. The entities interacting in the network 100 may include a messaging system 102, a presence information system 104, endpoints 106, or other entities. The messaging system may be a multimedia messaging system, or may selectively process specific types of messages such as voice messages, fax messages, instant messages, or other messages. Presence information 108 may be communicated between the endpoints 106 and the presence information system 104 and/or the messaging system 102.

The entities may communicate over a network 110 or interconnection of networks. The entities and networks 110 may exchange information using a packet based protocol. For example, the messaging system 102, presence information system 104, and endpoints 106 may employ the Real Time Protocol (RTP) over the User Datagram Protocol (UDP). Other protocols, including the Transmission Control Protocol/Internet Protocol (TCP/IP) or other network protocols may be additionally or alternatively employed. In addition, the signaling between the entities may proceed according to the H.323 packet-based multimedia communications system standard published by the International Telecommunications Union (ITU). The network or interconnection of networks 110 may include the Public Switched Telephone Network (PSTN) and may deliver data to cell phones, wireline phones, internet phones, or other communication devices.

The entities in the network 100 may employ protocols that adhere to any desired specification. For example, the entities may employ the Session Initiation Protocol (SIP) developed for Internet conferencing, telephony, presence, events notification and instant messaging, the Jabber protocol, or SIP for Instant Messaging and Presence Leveraging Extensions (SIMPLE). The form and content of the presence information may be established according to protocols consistent with the Internet Engineering Task Force (IETF) Request for Comments (RFC) 2778 or IETF RFC 2779. Alternatively, the entities may employ extensions to RFC 2778 or RFC 2779, or may employ proprietary protocols.

An endpoint 106 may be a communication device. The communication device may include audio reproduction capability that may be employed to deliver voice messages to a subscriber. The communication device may be a cellular phone, desk phone, pager, Personal Data Assistant (PDA), computer, specific programs executing on the computer, or other devices or programs.

A subscriber may have one or more presence states with respect to one or more endpoints 106. Table 1 shows examples of presence states and descriptions of the presence states.

TABLE 1

| Presence State | Note | Delivery Attempt Impact |
| --- | --- | --- |
| 'Available' | The subscriber is in the office and available to receive messages. | Increased Likelihood |
| 'In Office' | The subscriber is in the office. | Increased Likelihood |
| 'Be Right Back' | The subscriber is in the office but is not available. | Decreased Likelihood |
| 'In Meeting' | The subscriber is in the office but is not available because they are in a meeting. | Decreased Likelihood |
| 'On Business Trip' | The subscriber is not in the office and is not available to receive messages. | Decreased Likelihood |
| 'Out of Office' | The subscriber is not in the office and is not available to receive messages. | Decreased Likelihood |
| 'On Vacation' | The subscriber is not available to receive messages. | Decreased Likelihood |
| 'No Interruptions' | The subscriber is in the office but is not available to receive messages. | Decreased Likelihood |
| 'Working Remotely' | The subscriber is working and available, but not in the office. | Increased Likelihood |
| 'Unknown' | It is not known whether the subscriber is available. | No impact |

The presence states shown in Table 1 may be applicable to an individual subscriber. The presence states may also be applicable to other entities, including aggregate entities such as group mailboxes or group phone connections. For example, a presence state may reflect the availability of a group of customer service representatives in a complaint department. When no representative is available to handle the call, the caller may leave a message. The outcalling system may then initiate outcalling attempts to representatives in the complaint department based on presence information for the group. The presence information may reflect the availability of at least one member of the group, or may reflect other presence information applicable to the group.

For example, the 'Be Right Back' presence state indicates that the subscriber is in the office or otherwise available. However, the subscriber is temporarily away from the endpoint at which the subscriber receives messages. Different, fewer, or additional presence states may be used.

Presence states may also reflect an aggregated media state. The aggregated media states may apply to specific types of communication or may apply over any other subset of endpoints associated with the subscriber. As examples, the aggregated media states may apply to voice communications, instant messaging, and email messaging. Accordingly, a subscriber that is associated with multiple endpoints (e.g., phone numbers, email addresses, or instant messaging addresses) may have a presence state that aggregates availability over any subset of the endpoints. For example, a subscriber with a desk phone and a cell phone may have an aggregated media presence state of 'Busy' when at least one of the phones is in use. As another example, the subscriber may have an aggregated media presence state of 'Available' when both phones are not in use. Table 2 shows examples of aggregated media states. Different, fewer, or additional aggregated presence states may be used.

TABLE 2

| Presence State | Note | Delivery Attempt Impact |
| --- | --- | --- |
| 'Busy' | The subscriber is in the office but is currently busy. May be applicable for: Voice Communication | Decreased Likelihood |
| 'Online' | The subscriber is in the office and is connected to an instant messaging service. May be applicable for: Voice and Instant Messaging | Increased Likelihood |
| 'Offline' | The subscriber is disconnected from their instant messaging service. May be applicable for: Voice and Instant Messaging | Decreased Likelihood |
| 'Unknown' | The actual state fo the subscriber is currently unknown. May be applicable for: Voice, Instant Messaging, and email | No Impact |
| 'Available' | The subscriber is in the office, and is not on the phone, interacting with instant messaging, or interacting with an email system. May be applicable for: Voice, Instant Messaging, and email | Increased Likelihood |

Each presence state may have a predicted, likely, or perceived impact on message delivery to the subscriber. For example, when the presence state is 'Available', it may be more likely that a message delivery attempt will succeed. On the other hand, when the presence state is 'On Vacation', it may be unlikely that a message delivery attempt will succeed.

The impacts may vary based on the particular implementation, subscriber, endpoint, or other factors. For example, where the subscriber is known to consistently carry a cellular phone, 'On Business Trip' may instead be associated with an increased likelihood of successful message delivery.

The messaging system 102 may consider the presence state in determining whether to initiate a message delivery attempt to a subscriber. For example, the messaging system 102 may evaluate the presence state to determine whether the presence state reveals an increased likelihood of successful message delivery. For example, when the presence state is 'Available', the messaging system 102 may decide to initiate a voice message delivery attempt (e.g., through an outcall) to the subscriber when a new voice message arrives.

The messaging system 102 may instead determine that the presence state reveals a decreased likelihood of successful message delivery. For example, when the presence state is 'On Vacation', the messaging system 102 may forgo message delivery attempts. By considering the presence state, the messaging system 102 may reduce or eliminate message delivery attempts that are less likely to succeed and may thereby reduce or eliminate waste of channel resources.

The presence state need not be indicative of an increased or decreased likelihood of successful message delivery. In other words, the presence state may not favor a message delivery attempt or disfavor a message delivery attempt. For example, the presence state 'Unknown' may have no impact on successful message delivery.

The endpoints 106 and/or subscribers may communicate presence information to the presence information system 104, or directly to the messaging system 102. For example, the endpoints 106 may monitor subscriber activity and communicate a presence message to the presence information system 104. The presence message may indicate, as examples, that the subscriber has initiated a phone call, ended a phone call, started to type an instant message or email message, or may indicate any other presence information.

The presence information system 104 or messaging system 102 may receive the presence messages. The systems 102 and 104 may process the presence messages and may maintain presence information for one or more subscribers. Alternatively or additionally, the messaging system 102 may receive presence state information from the presence information system 104.

For example, the messaging system 102 may at any time poll the presence information system 104 for the current presence state of a subscriber. In response to the poll, the presence information system 104 may communicate presence state information for the subscriber to the messaging system 102. For example, when a new voice message arrives and meets the threshold criteria for outcalling (e.g., message importance, sender, subject, or other criteria), the messaging system 102 polls for the current subscriber presence state. The messaging system 102 may then consider the presence state in determining whether to attempt message delivery.

Alternatively, the messaging system 102 may subscribe to presence state information from the presence information system 104. When subscribed, the messaging system 102 may receive presence state information updates over time from the presence information system 104, without specifically requesting the update. The presence information system 104 may communicate presence state information updates to a subscribed messaging system according to any schedule, when a presence state changes, or at any other time.

Figure 2:
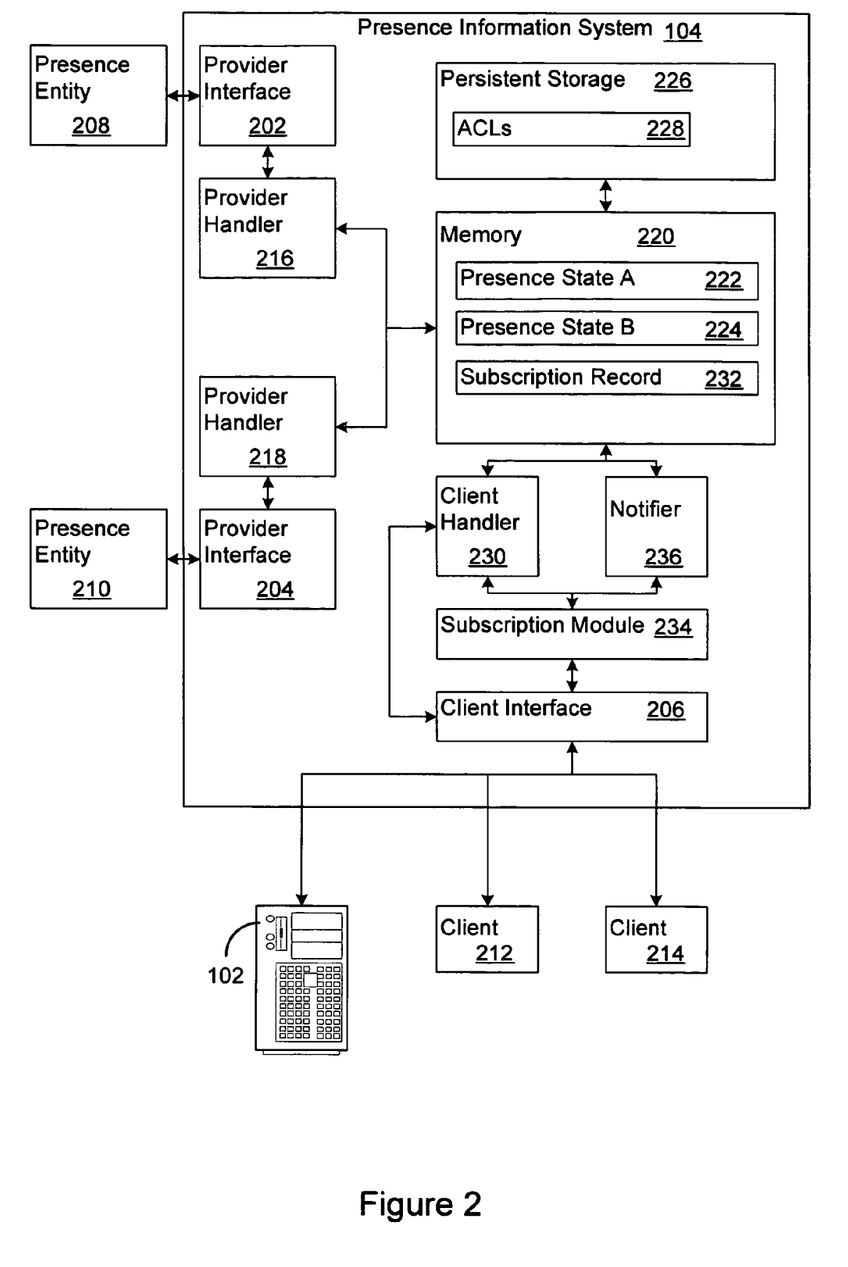
FIG. 2 illustrates one implementation of a presence information system.

FIG. 2 shows a block diagram of the presence information system 104. The presence information system 104 may be a server or a set of servers. The presence information system 104 may be connected to the networks 110 through a corporate intranet, a direct network connection, or other network connection.

The presence information system 104 may include one or more provider interfaces (e.g., the interfaces 202 and 204) and a client interface 206. The provider interfaces 202 and 204 may include circuitry and/or logic for communicating with presence entities (e.g., the entities 208 and 210), for example to receive presence information submitted by the entities 208 and 210. The client interface 206 may include circuitry and/or logic for communicating with the messaging system 102, programs, or other clients (e.g., the clients 212 and 214) that request presence state information.

The presence entities 208 and 210 may represent any subscriber, program, endpoint, device, or other entity that interacts with the presence information system 104. As examples, the presence entities 208 and 210 may be soft endpoints, hard endpoints, a Windows Messenger™ program, an IBM/Lotus Sametime™ Connect program, an AOL™, MSN™, Yahoo!™ instant messaging and presence program, a Siemens™ optiClient™ 130 program, or telephones, such as a Pingtel™ telephone or an optiPoint™ 400 telephone. Additional examples include programs such as calendars, groupware, document management systems; or other endpoints such as the network or communications infrastructure (which may indicate 'busy' even for devices that do not have explicit presence reporting), or dynamic presence proxies.

Similarly, clients may take many forms. Soft endpoints, hard endpoints, thin clients (e.g., clients without substantial processing capabilities and/or local storage), or other clients may request and receive presence state information through the client interface 206. Programs such as groupware, document management, and other enterprise software also may request and receive presence state information.

The presence entities 208 and 210 may comply with the IETF proposals noted above, or may employ proprietary protocols. The provider handlers 216 and 218 may provide an abstraction layer. The handlers 216 and 218 may convert presence information received from the presence entities 208 and 210 into a uniform format that may be stored in the memory 220.

The handlers 216 and 218 may also aggregate one or more presence states into an aggregated media state. The presence information system 104 may maintain presence states (e.g., the presence states 222 and 224) in the memory 220. As presence states change, the memory 220 may be updated, and the presence information system 104 may communicate presence state update information to clients.

The presence information system 104 may store all or part of the presence states 222 and 224 in a persistent storage 226. The persistent storage 226 may include a database with tables that store presence state information for one or more subscribers. The persistent storage 226 may also include other presence related information, such as Access Control Lists 228 (ACLs) or other security information that may determine which clients may obtain presence information for which subscribers.

The client interface 206 may receive presence state information requests, subscription requests, and other requests from a client. The requests may be communicated to the client handler 230 for processing. The client interface 206 may also transmit presence state information, including subscribed presence state information updates to the client.

The client handler 230 may perform request or client validation and may attempt to satisfy the request. When the request is a query, fetch, or poll of presence state information, the client handler 230 may check the identity of the client against the ACLs 228 for the subscriber whose presence is being checked. If the client is allowed to obtain the presence state information, the presence state information is retrieved from the memory 220 or persistent storage 226 and returned to the client interface 206.

If the client is not allowed to see the presence state information, the client may receive a predetermined presence value. The predetermined presence value may be selected so that the value does not give hints about the subscriber's presence. To that end, the value may specify 'Unknown', 'Offline', or another presence value. Alternatively, the presence information system 104 may reject the request for presence information.

When the request is a subscription request, the presence information system 104 may store a subscription record 232 in the memory 220. The subscription record 232 may include identifiers or other data that indicates that a particular client is watching one or more subscribers. The subscription record 2323 may also specify presence filters that limit or include specific types of presence state information for transmission to the client. For example a presence filter may specify that only 'Available' or 'Busy' presence states should be communicated to the client. The subscription module 234 may receive subscription requests and identifying information concerning the client that is watching the subscriber.

The presence information system 104 may activate the notifier 236. For example, the presence information system 104 may activate the notifier 236 when any of the presence states are modified and there are clients that are watching those presences states. The notifier 236 may include circuitry and/or logic that that informs the subscription module 234 that a change in presence state has occurred. The subscription module 234 may process the new presence state in conjunction with the outstanding presence subscriptions. For example, the subscription module 234 may apply a filter to the new presence state to determine if the new presence state is one that the client desires to receive. If so, the client interface 206 may communicate the presence state update information to the client that placed the subscription.

Figure 3:
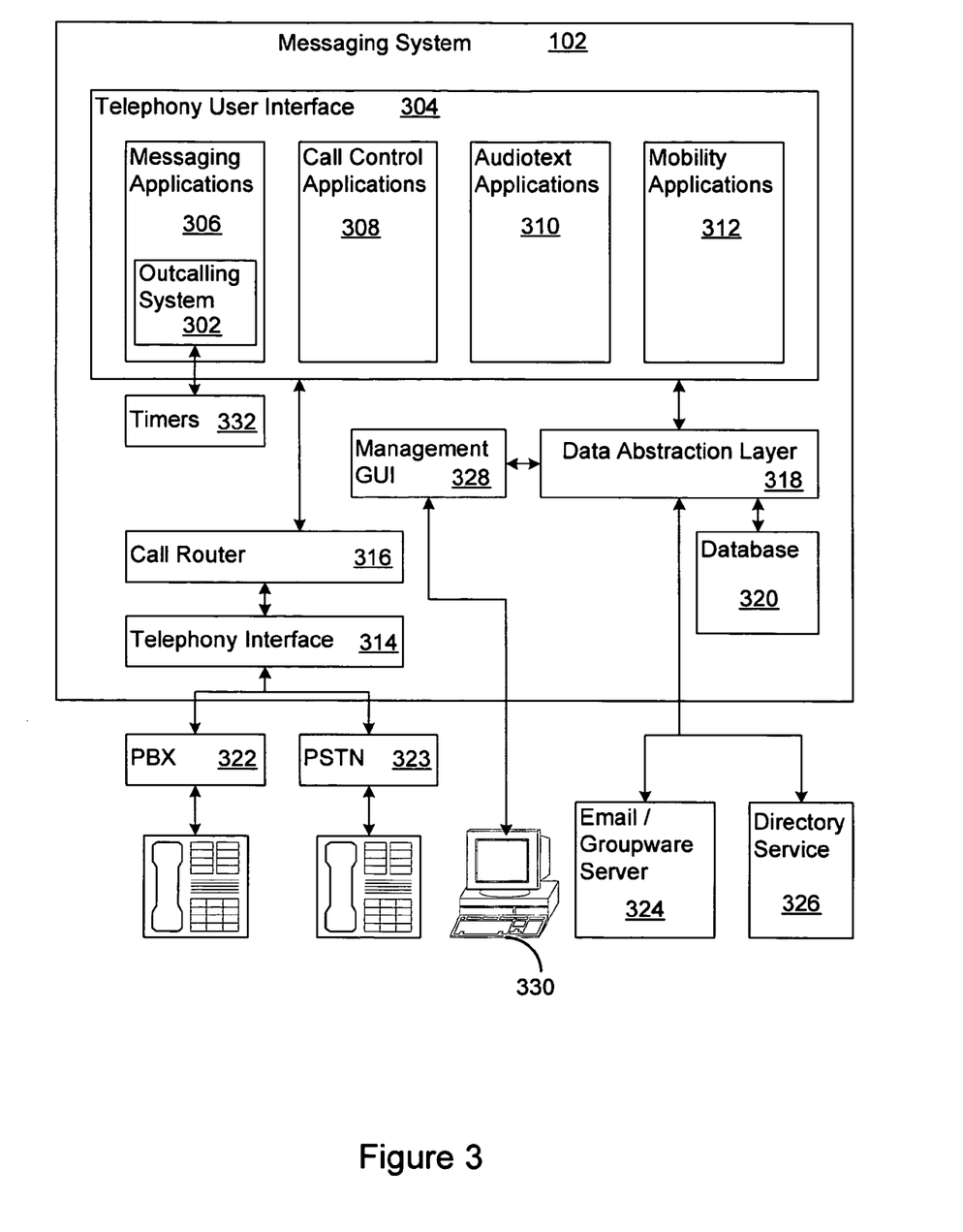
FIG. 3 illustrates one implementation of a messaging system.

FIG. 3 illustrates a block diagram of the messaging system 102. The core functionality of the messaging system 102 may be implemented with a Siemens™ Xpressions™ messaging server or other processor or servers. However, the messaging system 102 may be extended as described in this specification to incorporate an outcalling system 302 that considers presence state information in determining when to Initiate a message delivery attempt. The messaging system 102 may provide voice, fax, and email messaging services, including outcalling and may also provide a general purpose voice and speech application platform.

The messaging system 102 may include a telephony user interface 304. The interface 304 may support subscriber interactions through any combination of Dual Tone Multifrequency (DTMF) key input, speech recognition, Graphical User Interfaces (GUIs) or other input mechanisms. The telephony user interface 304 may include messaging applications 306, call control applications 308, audiotext applications 310, and mobility applications 312.

The outcalling system 302 may communicate information to the subscriber from any of the applications 306-312. In particular, the outcalling system 302 may inform a subscriber of new voice messages and may make delivery attempts for the voice messages. The outcalling system 302 may also attempt to deliver email, faxes, calendar appointments, or any other information to the subscriber.

The telephony interface 314 may include network interfaces for many different telephony devices. The devices may be supported through a public branch exchange (PBX) 322, public switched telephone network (PSTN) 323, or other infrastructure. The network interfaces may be Time Division Multiplexed (TDM) interfaces, direct trunk interfaces, Internet Protocol (IP) interfaces, or other interfaces. While the telephony interface 314 may externally support many different interfaces, the telephony interface 314 may present fewer (e.g., one) logical interfaces to the messaging system 102. The logical interface may be a telephony abstraction layer through which the messaging system 102 communicates with each of the network interfaces.

The call router 316 may handle incoming calls. The call router 316 may determine which application 306-312 will handle the call. The call router 316 may examine call information such as the calling number, called number, redirecting number, or other information to determine the appropriate application 306-312. Once the application 306-312 is determined, the call is physically or logically connected to the application 306-312. The application 306-312 may determine prompts to play to the subscriber and may process input from the call (e.g., DTMF tones that select menus options).

A data abstraction layer 318 may provide a single view of directory and message information that is independent of a particular information source. The data abstraction layer 318 also may provide the messaging system 102 with flexible support for email, groupware, or other application servers 324 that interact with the messaging information in the database 320. The messaging information may reside in an external store or an internal store, and may be synchronized between the stores. In some implementations, the database 320 may store messages, while in other implementations, the messages may be accessed through the data abstraction layer 318. The data abstraction layer 318 may support one or more directory services 326, such as the Active Directory service, Exchange 5.5 directory service, Domino service, generic Lightweight Directory Access Protocol service, or other services.

The management GUI 328 may provide a graphical user interface for both subscribers and administrators (e.g., through an administration terminal 330). Administrators may manage settings such as system wide call routing, holiday settings, tracing, or other options or settings. Subscribers may manage settings such as their greetings, their personal call handling rules, their outcalling preferences and criteria, their schedule, or other options.

The subscriber may use the telephone interface 314 or the management GUI 328 to set outcalling options, (e.g., to activate outcalling or establish message filters), outcalling schedules, to specify criteria that may trigger outcalling, or set other outcalling options. The outcalling system 102 may store or establish a pre-selected state or set of states that indicate increased likelihood of successful message delivery. Alternatively, the subscriber may specify the presence states that indicate increased likelihood of message delivery to that subscriber.

For example, one subscriber may select both 'Available' and 'Be Right Back' as presences that indicate an increased likelihood of successful message delivery. More sophisticated rules may be established using logical tests, conditions, branches. For example, a subscriber may establish a rule that "If the message sender is my boss, then a presence state of 'In Meeting' indicates an increased likelihood of successful message delivery."

The subscriber may also specify one or more telephone numbers, pager numbers, email addresses, or other endpoints to which the outcalling system 302 should attempt message delivery. The outcalling system 302 may place an outcall to one or more of the endpoints in parallel or sequentially.

The outcalling system 302 may place a telephone call to the subscriber. For example, the outcalling system 302 may call the subscriber when the messaging system 102 has received a message for the subscriber. The message may be a voice message, email, video, facsimile or other type of message. The message also may be a compound message. The compound message may be a message that has multiple parts of the same or different media types. As one example, a compound message may be a fax with three voice attachments.

The messaging system 102 may receive messages for the subscriber. The messages may be placed in a message store for the subscriber. When a message arrives (or at other times), the messaging system 102 may check the outcalling options set by the subscriber to determine whether and when to schedule an outcall in an attempt to deliver the message. For example, a message filter may specify that the outcalling system 102 should attempt to deliver messages that are 'Urgent', once every hour, on both work days and weekends.

The outcalling system 302 may establish a queue of scheduled outcalls. The queue may be associated with one or more timers 332. When the outcalling system 302 attempts to deliver a message, but cannot (e.g., because the subscriber does not answer, the line is busy, or for other reasons), the outcalling system 302 may re-queue the delivery attempt. For example, the subscriber outcalling options may specify that the delivery attempt should be repeated every hour. The timers 332 may wake-up, activate, or otherwise inform the outcalling system 302 that the time has come to again attempt message delivery.

In making an outcall to the subscriber, the outcalling system 302 may attempt to establish a connection to the subscriber endpoint. For example, the outcalling system 302 may place a telephone call to a registered telephone number. The messaging system 120 detects when the call is answered. The messaging system 102 may audibly inform the entity answering the phone that the messaging system 102 is attempting to deliver a message for the subscriber.

If the answering entity indicates that the number is wrong, the outcalling system 302 may stop trying to call that number. If the answering entity indicates that the subscriber is not currently available, the outcalling system 302 may initiate another delivery attempt at a later time. If the delivery attempt fails because the call was not answered or because the phone was busy, the outcalling system 302 may also initiate a delivery attempt at a later time. The retry period may be shorter if the phone was busy than if the phone was not answered. Other adaptations to the retry period may be employed.

The subscriber may answer the outcall and may log-on to the outcalling system 302. The subscriber may receive one or more messages while logged-on. The outcalling system 302 delivers messages to the subscriber and may remove the messages from the outcalling system 302, record successful delivery of the message, or perform other record keeping functions.

Figure 4:
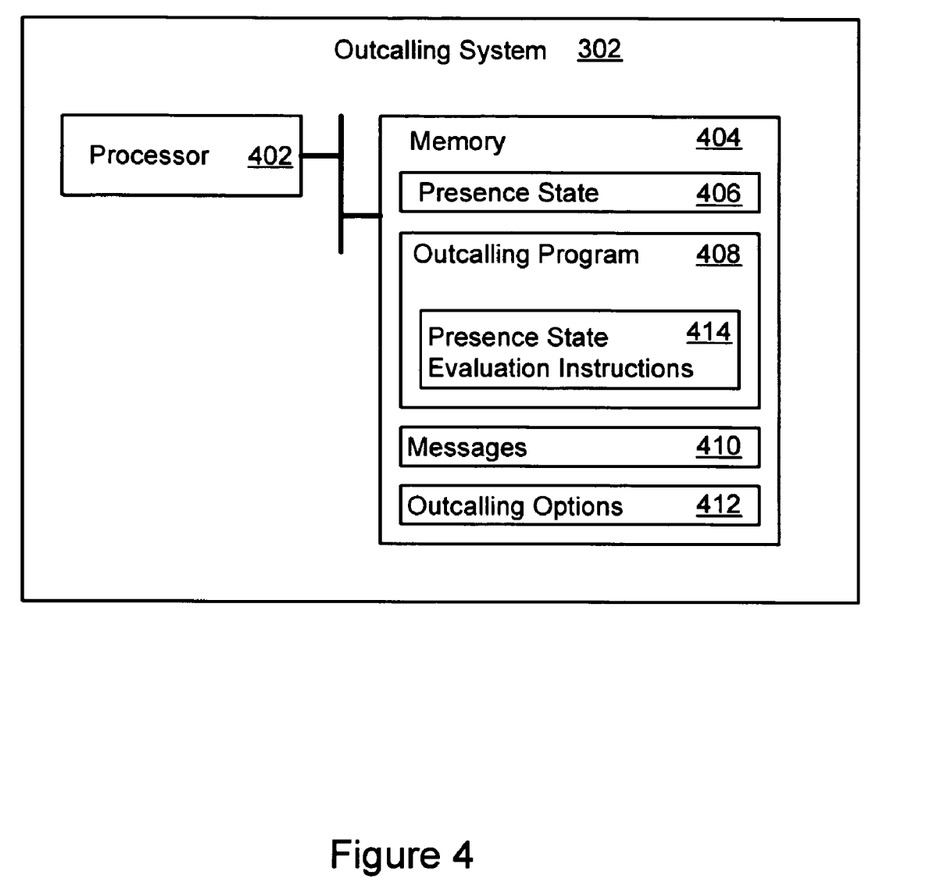
FIG. 4 illustrates one implementation of an outcalling system in the messaging system.

FIG. 4 shows a block diagram of the outcalling system 302. The outcalling system 302 includes a processor 402 and a memory 404. The memory may include presence states 406, an outcalling program 408, messages 410, and outcalling options 412. The outcalling program 408 may include presence state evaluation instructions 414.

The presence states 406 may be obtained for any subscriber by polling or subscribing to the presence information system 104, by receipt from a subscriber, or in other manners. The messages 410 may represent compound or non-compound messages for the subscriber. The outcalling options 412 may specify message delivery schedules, message filters, outcalling activation, or other outcalling options for the subscriber.

The outcalling system 302 may consider the presence states 406 when determining whether to initiate or queue a message delivery attempt. To that end, the outcalling program 408 may include the presence state evaluation instructions 414. The evaluation instructions 414 may examine the presence state for the subscriber and may determine whether the presence state is indicative of an increased likelihood of successful message delivery, a decreased likelihood of successful delivery, has no bearing on likelihood of successful delivery, or is indicative of other ramifications on message delivery attempts.

The evaluation instructions 414 may determine that the presence state 406 indicates an improved likelihood of successful message delivery. In that case, the outcalling system 302 may initiate an outcalling message delivery attempt to the subscriber. On the other hand, when the evaluation instructions 414 determine that the presence state 406 indicates that message delivery is unlikely to succeed, the outcalling system 302 may forgo a message delivery attempt. The outcalling system 302 may forgo the delivery attempt regardless of the type or status of the message (e.g., regardless of the fact that a message is marked 'Urgent').

The evaluation instructions 408 may provide a recommendation that message delivery is attempted, not attempted, or may provide no recommendation. The outcalling system 302 may accept the recommendation or may override the recommendation based on the outcalling options 412. For example, despite the fact that the presence state is 'Not Available', the outcalling system 302 may initiate a message delivery attempt when the outcalling options 412 specify that message delivery attempts should be made for all 'Urgent' messages.

Figure 5:
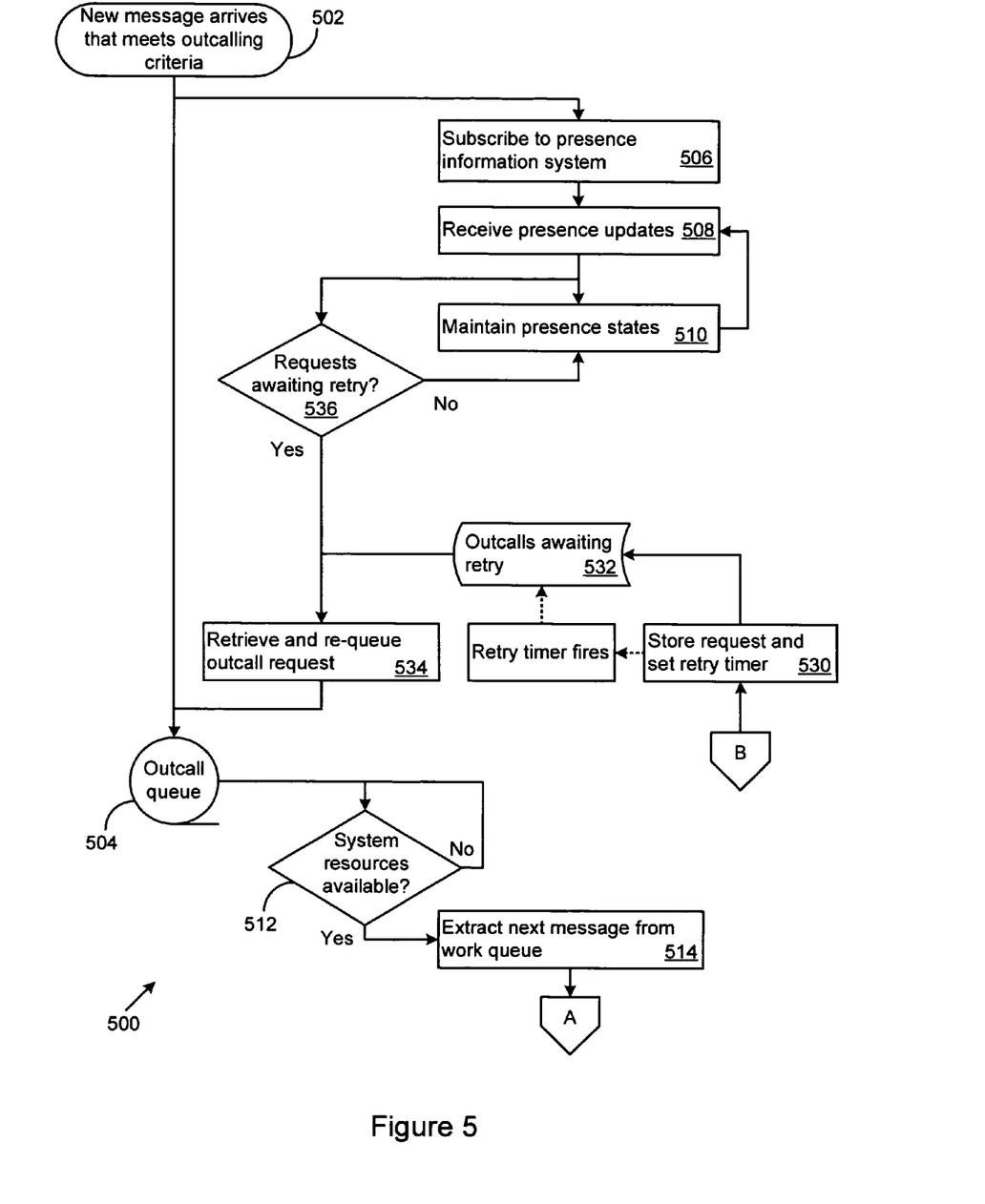
FIG. 5 illustrates the acts that may be taken by one implementation of an outcalling system.

FIG. 5 provides a flow diagram 500 that summarizes the acts that may be taken by the outcalling system 302. Initially, a message arrives for a subscriber and is received (Act 502). If the message meets the outcalling criteria set by the subscriber, the outcalling system 302 may place the message in the outcalling queue 504.

In addition, the outcalling system 302 subscribes to the presence information system 104 for presence state update information (Act 506). Alternatively, the outcalling system 302 may poll for an update when desired. The messaging system 102 also may receive presence state information from other sources, including directly from the subscriber. The outcalling system 302 receives the presence update information (Act 508) and may maintain the presence state for one or more subscribers (Act 510).

When there are messages on the outcalling queue 504, the outcalling system 302 may determine whether system resources are available for a message delivery attempt (Act 512). When resources are available, the outcalling system 302 may extract the next message from the queue 504 (Act 514).

Subscriber presence state is retrieved (Act 516) and may be considered in the determination of whether to initiate a delivery attempt. If the outcalling program 408 determines that the presence is favorable (e.g., the presence indicates an increased likelihood of successful delivery), the outcalling program 408 may recommend initiating a delivery attempt for the message (Act 518). Similarly, the if the presence is unfavorable, the outcalling program 408 may recommend forgoing a delivery attempt for the message (Act 520). If the presence is indeterminate, the outcalling program 408 may make no recommendation (Act 522).

The outcalling program 408 may determine a communications channel (e.g., e-mail, voice, instant message, or other channel) or endpoint for the message delivery attempt based on the presence state. An increased likelihood may be indicated for one channel, while a decreased likelihood may be indicated for a different channel. The outcalling program 408 may determine or recommend initiation of the outcall on a channel or to an endpoint for which a presence state indicates that a successful delivery attempt is more likely.

The outcalling system 302 determines whether to initiate the message delivery attempt (Act 524). The recommendation made by the outcalling program 408 may be considered, but need not be determinative. When the outcalling system 302 determines to proceed with the delivery attempt, the outcalling system 302 performs the outcall (Act 526). If the message was successfully delivered, the message may be removed from the outcalling queue 504 and the delivery request may be cleared (Act 528). The outcalling system 302 also may un-subscribe from presence updates for a given subscriber if there are no more messages to be delivered to the subscriber.

If the message was not successfully delivered, the outcalling system 302 may reschedule a delivery attempt (Act 530). In doing so, the outcalling system 302 may set or establish timers that determine the retry period. In the meantime, the outcalling system 302 may continue to maintain presence states, and may check for other outcalls awaiting retries (Act 532) because, for example, their retry timers have fired. When an outcall is awaiting a retry, the outcalling system 302 may retrieve and re-queue an outcalling request on the outcall queue 504 (Act 534).

Note also that in addition to placing retries on a timer, the outcalling system 320 may also schedule a delivery attempt before expiration of the timer. In particular, a presence update (Act 508) may signal the outcalling system 302 that the subscriber has potentially become available before the end of the retry period. In response, the outcalling system 302 may immediately schedule a message delivery attempt, particularly if the presence state is favorable.

For example, when a presence update arrives (e.g., presence has changed for a subscriber), the outcalling system 302 also may check whether the subscriber has any outcalling requests presently awaiting a retry (Act 536). If so, the outcalling system 302 may immediately queue an outcall to attempt to deliver any messages that are currently pending retry (Act 534). Thus, the outcalling system 302 may queue a message delivery attempt regardless of the timer status. If the subscriber presence state has changed, but the message delivery attempt is already queued, the outcalling system 302 may instead continue to maintain the subscriber presence state (Act 510).

FIG. 5 shows that a new message may go immediately into the outcall queue 504 and that a request to start monitoring presence is processed (Act 506). A presence subscription may be established when a message has arrived for a subscriber, and the outcalling system 302 has not already established a presence update subscription for that subscriber. The outcalling system may continue to receive and maintain presence state (Acts 508 and 510) asynchronously with regard to the other acts shown in FIG. 5. Asynchronously the presence state changes, and triggers the re-evaluation of the outcall awaiting retry (Act 536).

Considering presence state and responsively scheduling a delivery attempt may result in more timely delivery of messages to subscribers. For example, if the retry period is one hour, and the last delivery attempt failed, the subscriber would ordinarily wait a full hour before another delivery attempt was made. However, if the presence state changes prior to expiration of the hour, the outcalling system 302 may evaluate the new presence state, determine if it indicates a likelihood of successful delivery, and responsively attempt delivery of one or more messages. Accordingly, the subscriber may receive messages as soon as they are available, rather than wait for a timer to expire.

The outcalling system 302 may be apportioned a limited number of communication channels (e.g., physical ports in the case of TDM interfaces), logical resources (for IP interfaces), or other communication resources. By considering the presence state of a subscriber, the outcalling system 302 may make more effective use of the limited resources available to the outcalling system 302. As a result, the outcalling system 302 may successfully deliver more messages on a more timely basis, or may otherwise more efficiently use the limited resources to deliver messages to subscribers.

It is therefore intended that the foregoing detailed description be regarded as illustrative rather than limiting, and that it be understood that it is the following claims, including all equivalents, that are intended to define the spirit and scope of this invention.

The invention claimed is:

1. An outcalling method performed by a messaging system comprising:
   obtaining multiple endpoint availabilities for a subscriber to the messaging system who is associated with multiple endpoints;
   aggregating the multiple endpoint availabilities into an overall availability as a whole for the subscriber;
   establishing the overall availability as a whole as an aggregated media presence state for the multiple endpoints, where the aggregated media presence state is a current state of the subscriber and is a result of the multiple endpoint availabilities;
   determining whether the aggregated media presence state indicates an improved likelihood of successful delivery of the message;
   determining that a message is available for the subscriber;
   initiating a delivery attempt for the message to the subscriber;
   upon delivery failure of the message, setting a retry timer for again attempting delivery of the message; and
   responsively retrying delivery of the message prior to expiration of the retry timer when the aggregated media presence state indicates the improved likelihood of successful delivery of the message.

2. The method of claim 1, further comprising:
   deciding to initiate the delivery attempt for the message when the aggregated media presence state indicates that at least one of the endpoints is presently available to receive the message.

3. The method of claim 1, where obtaining comprises:
   obtaining multiple phone endpoint availabilities.

4. The method of claim 3, where aggregating comprises:
   aggregating the multiple phone endpoint availabilities into an overall phone availability as a whole for the subscriber.

5. The method of claim 1, where obtaining comprises:
   obtaining multiple email endpoint availabilities; and where aggregating comprises: aggregating the multiple email endpoint availabilities into an overall email availability as a whole for the subscriber.

6. The method of claim 1, further comprising:
   forgoing the delivery attempt when the aggregated media presence state indicates that the subscriber is unlikely to receive the message.

7. The method of claim 1, where obtaining comprises:
   obtaining multiple instant messaging endpoint availabilities; and where aggregating comprises:

aggregating the multiple instant messaging endpoint availabilities into an overall email availability as a whole for the subscriber.

8. The method of claim 1, further comprising:
subscribing to a presence information system and receiving presence information for the subscriber from the presence information system.

9. The method of claim 8, where receiving presence information comprises:
receiving presence state updates over time for the subscriber.

10. A messaging system for outcalling, the system comprising:
a memory comprising:
an aggregated media presence state for a subscriber to a messaging system, the aggregated presence state being a current state of the subscriber and a result of multiple endpoint availabilities for the subscriber;
an outcalling program comprising instructions operable to obtain the multiple endpoint availabilities for the subscriber, aggregate the multiple endpoint availabilities into an overall availability as a whole for the subscriber, establish the overall availability as a whole as the aggregated media presence state for the subscriber, initiate a delivery attempt for a message for the subscriber, set a retry timer upon delivery failure of the message for again attempting delivery of the message, and consider favorability of the aggregated presence state for the subscriber and responsively retry delivery of the message prior to expiration of the retry timer; and
a processor coupled to the memory that executes the instructions.

11. The outcalling system of claim 10, further comprising a network interface, and where the processor is operable to receive presence state updates for the subscriber over the network interface.

12. The outcalling system of claim 11, where the presence state updates are subscribed presence state updates received from a presence information system.

13. The outcalling system of claim 10, where the instructions are operable to initiate the delivery attempt when the aggregated presence state is consistent with likely subscriber reception of the message.

14. The outcalling system of claim 10, where:
the multiple endpoint availabilities comprise voice message endpoint availabilities; and where:
the overall availability as a whole comprises an overall voice message availability as a whole for the subscriber.

15. The outcalling system of claim 10, where the instructions are operable to forgo initiation of the delivery attempt when the presence state is inconsistent with likely subscriber reception of the message.

16. The outcalling system of claim 10, where:
the multiple endpoint availabilities comprise email endpoint availabilities; and where:
the overall availability as a whole comprises an overall email message availability as a whole for the subscriber.

17. The outcalling system of claim 10, where the instructions are operable to initiate the delivery attempt when the aggregated presence state indicates an improved likelihood of successful delivery of the message.

18. A machine readable medium storing instructions executable by a processor in a machine and that cause the machine to:
obtain multiple endpoint availabilities for the subscriber;
aggregate the multiple endpoint availabilities into an overall availability as a whole for the subscriber;
establish the overall availability as a whole as an aggregated media presence state for the subscriber, the aggregated media presence state being a current state of the subscriber and a result of the multiple endpoint availabilities;
establish an outcalling queue;
queue messages in the outcalling queue;
determine that a selected message from among the messages in the outcalling queue is awaiting delivery to a subscriber;
extract the selected message for the subscriber from the outcalling queue and initiate an outcalling delivery attempt for the message;
upon delivery failure of the message set a retry timer for again attempting delivery of the message; and
considering favorability of the aggregated presence state for the subscriber and responsively retrying delivery of the message prior to expiration of the retry timer.

19. The medium of claim 18, where the medium further comprises instructions that cause the processor to:
subscribe to a presence information system for obtaining updates to the aggregated presence state.

20. The medium of claim 18, further comprising instructions stored on the medium that cause the processor to:
re-queue the selected message in the outcalling queue when the outcalling delivery attempt fails.

21. The medium of claim 18, where:
the multiple endpoint availabilities comprise email endpoint availabilities; and where:
the overall availability as a whole comprises an overall email availability as a whole for the subscriber.

22. The medium of claim 18, where:
the multiple endpoint availabilities comprise voice message endpoint availabilities; and where:
the overall availability as a whole comprises an overall voice message availability as a whole for the subscriber.

23. The medium of claim 18, where:
the multiple endpoint availabilities comprise instant message endpoint availabilities; and where:
the overall availability as a whole comprises an overall instant message availability as a whole for the subscriber.

24. The medium of claim 18, where responsively retrying delivery of the message includes responsively retrying delivery of the message when the aggregated presence state indicates an improved likelihood of successful delivery of the message.

* * * * *